Figure 1:
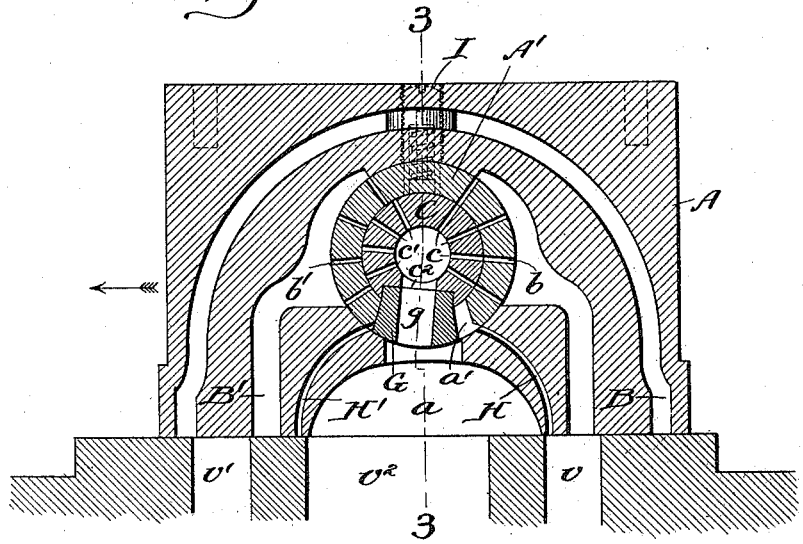

(No Model.) 2 Sheets—Sheet 1.

C. SCHMID.
VALVE MECHANISM FOR STEAM ENGINES.

No. 584,794. Patented June 22, 1897.

Witnesses
Martin H. Olsen
S. Cross

Inventor
Charles Schmid
By Grier & Hopkins
His attorneys (No Model.) 2 Sheets—Sheet 2.
C. SCHMID.
VALVE MECHANISM FOR STEAM ENGINES.
No. 584,794. Patented June 22, 1897.
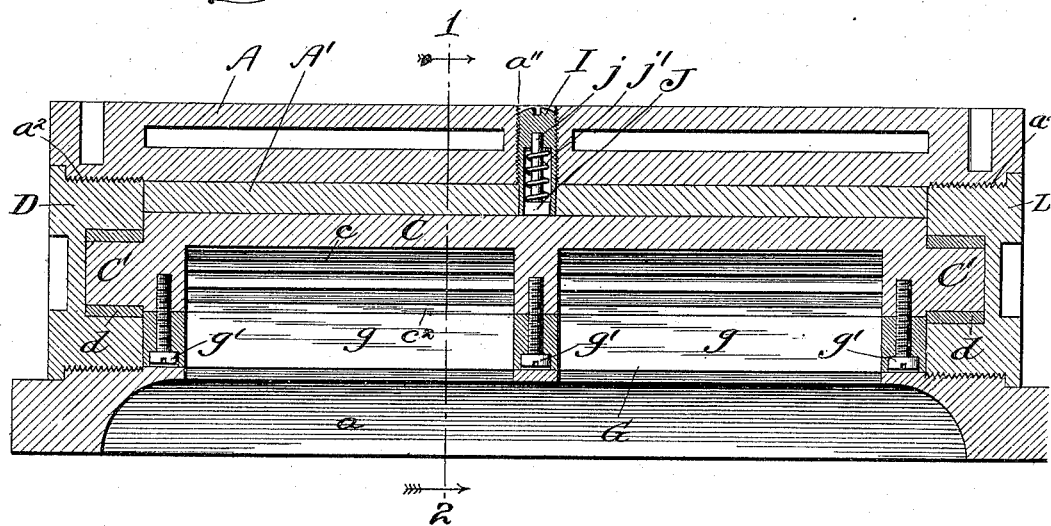
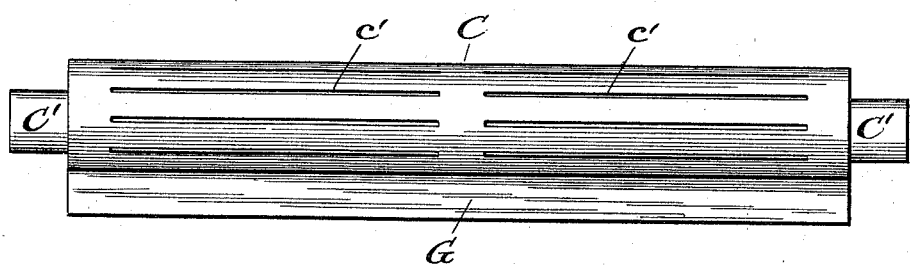
Witnesses
Martin H. Olsen.
J. Cross.
Inventor
Charles Schmid
By Gridley Hopkins
His attorneys

UNITED STATES PATENT OFFICE.

CHARLES SCHMID, OF CHICAGO, ILLINOIS, ASSIGNOR OF ONE-HALF TO DENNIS O. B. LADD, OF BOSTON, MASSACHUSETTS.

VALVE MECHANISM FOR STEAM-ENGINES.

SPECIFICATION forming part of Letters Patent No. 584,794, dated June 22, 1897.

Application filed January 2, 1897. Serial No. 617,787. (No model.)

*To all whom it may concern:*

Be it known that I, CHARLES SCHMID, a citizen of the United States, residing at Chicago, in the county of Cook and State of Illinois, have invented certain new and useful Improvements in Valve Mechanism for Steam-Engines, of which the following is a specification.

The present invention relates to a valve mechanism of the class in which provision is made for maintaining that end of the cylinder toward which the piston is for the time being moving in open communication with the exhaust-port until the piston has completed its stroke, the object being to avoid compression.

More particularly stated, the invention relates to that species of valve mechanism, belonging to this general class, in which there is a main valve having an exhaust-cavity which establishes communication between the exhaust-port and the cylinder-ports of the valve-seats and which in addition to the exhaust-cavity has exhaust-ports under the control of a supplemental valve which it carries, the parts being so constructed and arranged that at each stroke of the main valve the supplemental valve will be automatically shifted to such position that after the main valve has cut off communication between the exhaust-port and the cylinder-port through which steam is for the time being exhausting this latter port will be in communication with the exhaust-port through one of the auxiliary exhaust-ports of the main valve and the supplemental valve. An example of a valve of this description is shown and described in United States Letters Patent No. 554,145, which were granted to me on the 4th day of February, 1896. In the example shown in this patent the auxiliary valve is of cylindrical shape in cross-section and occupies a seat of corresponding shape in the main valve. It is provided with a longitudinal rib or wing to the opposite sides of which steam is admitted alternately, first on one side and then on the other, for the purpose of oscillating the auxiliary valve, the channels through which steam is conducted to the wing being the result of a space left between the part forming the main body of the main valve and a part, called in the patent the "exhaust plate or wall," in which the exhaust-cavity proper of the main valve is formed. This exhaust plate or wall is a separate casting, which is secured to the main valve by means of bolts and which is provided in its top side with a curved seat for the wing of the supplemental valve, this seat and the opposing outer surface of the wing being concentric with the axis of motion of the supplemental valve.

The object of the present invention is to improve the mechanical construction of valves of this class and particularly to dispense with the exhaust plate or wall formed as a separate piece and secured to the main body of the main valve by bolts.

To this end the invention consists in the features of novelty which are hereinafter particularly described with reference to the accompanying drawings, which are made a part of this specification, and in which—

Figure 2:
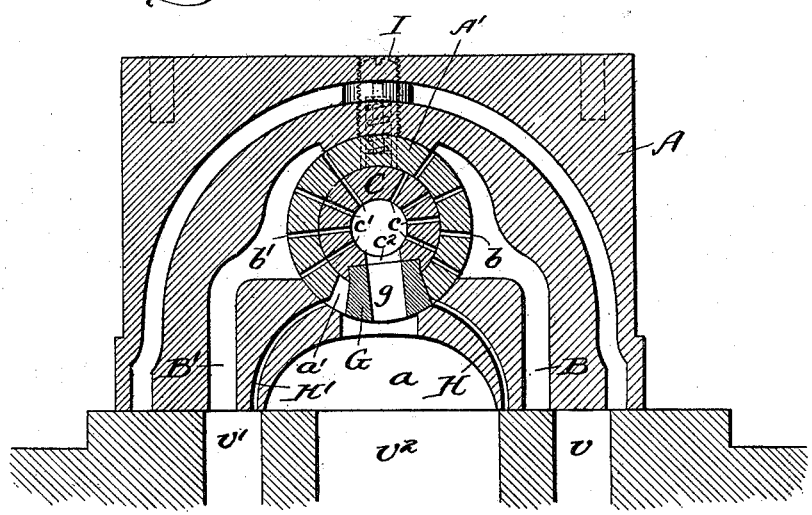

Figures 1 and 2 are transverse sections of a valve embodying the invention, the plane of the section being indicated by the line 1 2, Fig. 3, and the parts being viewed in the direction of the arrow. Fig. 3 is a longitudinal section thereof on the line 3 3, Fig. 1. Fig. 4 is a side elevation of the supplemental valve.

A represents the main body of the main valve, provided in its under side with an exhaust-cavity $a$, by which the ports $v$ $v'$, leading to the opposite ends of the cylinder, are alternately placed in communication with the exhaust-port $v^2$ as the main valve travels back and forth. The body of the main valve is provided also with exhaust-ports B B', leading from the face of the valve to a recess in which is disposed a shell A', provided on its interior with a cylindrical socket or seat in which fits snugly, but so as to be capable of oscillating about its axis, the supplemental valve C. The shell is provided with one or more ports $b$ $b'$, which lead from the ports B B', respectively, to the seat of the supplemental valve, where they are adapted to register with ports $c$ $c'$, respectively, with which the supplemental valve is provided. The supplemental valve is provided also with a port $c^2$, which communicates with the exhaust-cavity $a$ through a port $g$, formed through the wing G of the supplemental valve. This wing preferably extends from end to end of the supplemental valve and is secured to it by screws $g'$. It occupies a recess or longitudinal opening $a'$ in the shell $A'$, the opening being sufficiently wider than the wing to permit of the necessary oscillatory movement of the supplemental valve. In the main body of the main valve are formed also channels H H', which extend from opposite sides of the recess $a'$ to the face of the main valve, where they terminate between the exhaust-cavity $a$ and the exhaust-ports B B', respectively. The ends of the main body of the main valve are provided with threaded openings $a^2$, which are of sufficient diameter to permit the shell $A'$ to be inserted through them, and these openings are closed by threaded plugs D, in the inner faces of which are sockets for receiving the trunnions $C'$ of the supplemental valve, these sockets being preferably provided with bushings $d$.

In assembling the parts the wing G is first secured to the supplemental valve, the supplemental valve is then placed in its seat in the shell $A'$, the shell is then inserted in its cavity in the main body of the main valve through one of its openings $a^2$, after which said opening is closed by the plug D. This construction obviates the necessity for the separate exhaust plate or wall. An essential feature of the invention is therefore providing the main body of the main valve, in at least one of its ends, with an opening of sufficient size to admit the supplemental valve with its wing attached, and means, such as the plug D, for closing this opening, and preferably, though not necessarily, the seat for the supplemental valve is formed in a shell which extends radially at least to the outer face of the wing, the opening of the main body of the main valve being also of sufficient size to admit this shell.

The shell is prevented from rotating within the main body of the main valve by means of a plug I, which is threaded on its exterior and screwed into a threaded opening $a''$ in the main body and at its end enters a suitable opening formed for it in the shell. This plug I is preferably hollowed out to form a socket in which fit the parts of a friction-brake which operates upon the supplemental valve and prevents its accidental movement, either under the influence of gravity or under the influence of the impact of its wing G with the side of the recess in which it fits. Preferably this brake consists of a shoe J, having contact with the valve, a stem $j$, carrying the shoe, and a coiled spring $j'$, bearing at one end against the shoe and at the other end against the end of the socket in which the parts are arranged.

Having thus described my invention, the following is what I claim as new therein and desire to secure by Letters Patent:

1. A valve mechanism comprising, in combination, a main valve, a supplemental valve carried by the main valve and having a wing adapted to receive steam-pressure for operating the supplemental valve, the main valve being provided with exhaust-ports controlled by the supplemental valve, and an opening in one of its ends for admitting the supplemental valve and its wing, and means for closing said opening, substantially as set forth.

2. A valve mechanism comprising, in combination, a main valve, a supplemental valve carried by the main valve and having a wing adapted to receive steam-pressure for operating the supplemental valve, the body of the main valve being provided with exhaust-ports controlled by the supplemental valve, channels adapted to convey steam to the wing of the supplemental valve, and an opening in one of its ends for admitting the supplemental valve and its wing, and means for closing said opening, substantially as set forth.

3. A valve mechanism comprising, in combination, a main valve, a supplemental valve carried by the main valve and having a wing adapted to receive steam-pressure for operating the supplemental valve, a shell surrounding the supplemental valve and provided with a seat therefor, the main body of the main valve having exhaust-ports, a recess in which the shell fits, and an opening in one of its ends for admitting the supplemental valve and shell, the shell having ports registering with the exhaust-ports of the main valve, and a recess occupied by the wing of the supplemental valve, and means for closing the opening in the end of the body of the main valve, substantially as set forth.

4. A valve mechanism comprising, in combination, a main valve, a supplemental valve carried by the main valve and having a wing adapted to receive steam-pressure for operating the supplemental valve, a shell surrounding the supplemental valve, said shell having a seat for the supplemental valve, a recess occupied by the wing of the supplemental valve, and ports controlled by the supplemental valve, the main body of the main valve being provided with exhaust-ports registering with the ports of the shell, substantially as set forth.

5. A valve mechanism comprising, in combination, a main valve, a supplemental valve carried by the main valve and having a wing adapted to receive steam-pressure for operating the supplemental valve and a shell surrounding the supplemental valve, said shell being provided with a seat for the supplemental valve, a recess occupied by the wing of the supplemental valve and ports controlled by the supplemental valve, and the main body of the main valve being provided with steam-channels communicating with the recess of the shell upon opposite sides of the wing of the supplemental valve and with exhaust-ports communicating with the ports of the shell, substantially as set forth.

6. A valve mechanism comprising, in combination, a main valve, a supplemental valve, a shell having a seat for the supplemental valve and having ports controlled by the supplemental valve and means for preventing the shell turning within the main body of the main valve, the main body of the main valve being provided with exhaust-ports registering with the ports of the shell, substantially as set forth.

7. A valve mechanism comprising, in combination, a main valve, a supplemental valve, a seat in which the supplemental valve is adapted to oscillate and a friction-brake engaging the supplemental valve, the seat of the supplemental valve being provided with ports which are controlled by the supplemental valve and the body of the main valve being provided with ports registering with the ports of the seat of the supplemental valve, substantially as set forth.

CHARLES SCHMID.

Witnesses:
N. C. GRIDLEY,
L. M. HOPKINS.